US008523575B2

(12) United States Patent
Ternouth (10) Patent No.: US 8,523,575 B2
(45) Date of Patent: Sep. 3, 2013

(54) RECALLING ITEMS OF INFORMATION (75) Inventor: Adrian Scott Ternouth, Tamarama (AU)

(73) Assignee: Nextthinksoft Pty Ltd., Brisbane (AU)

( * ) Notice: Subject to any disclaimer, the term of this patent is extended or adjusted under 35 U.S.C. 154(b) by 1545 days.

(21) Appl. No.: 11/047,601

(22) Filed: Feb. 2, 2005

(65) Prior Publication Data
US 2005/0191608 A1      Sep. 1, 2005

Related U.S. Application Data (63) Continuation-in-part of application No. PCT/AU03/01128, filed on Sep. 2, 2003.

(30) Foreign Application Priority Data

Sep. 2, 2002  (AU) .................................. 2002951166
Sep. 13, 2004  (AU) .................................. 2004905209

(51) Int. Cl.
G09B 7/00 (2006.01)
(52) U.S. Cl.
CPC ....................................... *G09B 7/00* (2013.01)
USPC ........... 434/322; 434/323; 434/118; 434/350; 434/353; 434/362

(58) Field of Classification Search
USPC ..................... 273/429; 324/754; 340/286.01; 351/223, 240; 365/222; 370/241.1, 392; 434/118, 156, 157, 169, 201, 218, 219, 226, 434/236, 247, 307 R, 322, 323, 324, 325, 434/332, 334, 335, 336, 337, 350, 352, 353, 434/354, 362, 365; 463/8; 536/23.1, 23.5; 702/108; 703/22; 705/11, 14; 706/3, 16, 706/25, 45, 52; 707/104.1; 709/204, 220; 714/37, 42, 724; 73/1.45, 168; 717/104; 715/206–208
See application file for complete search history.

(56) References Cited

U.S. PATENT DOCUMENTS 5,267,865 A * 12/1993 Lee et al. ...................... 434/350
5,316,485 A * 5/1994 Hirose .......................... 434/322

(Continued)

FOREIGN PATENT DOCUMENTS

DE          35 08 490 C2      9/1986
JP          A 03-038686       2/1991

(Continued)

OTHER PUBLICATIONS

GE Office Action issued in GE Application No. 103 93 189.9 dated Dec. 30, 2011 (w/ English Translation).

*Primary Examiner* — Xuan Thai
*Assistant Examiner* — Alvin Carlos
(74) *Attorney, Agent, or Firm* — Oliff & Berridge, PLC (57) ABSTRACT

A method of testing and improving recall information using an automated device. An item of information is connected to an initial prompt by a relationship link. The device presents the initial prompt to the user who recalls information and links to the prompt. The device reviews the information and links and the user compares the reviewed intended information with the recalled information. The user provides inputs to the device indicating an ability to recall the information and links. The inputs provided by the user are used to calculate a re-testing interval for each item of information. The device automatically re-test the user after the interval calculated for each item of information has elapsed. A longer interval is used for items of information recalled exactly than the interval for items of information not recalled exactly. At re-testing information not yet done for re-testing is presented to the user.

16 Claims, 4 Drawing Sheets

(56) References Cited

U.S. PATENT DOCUMENTS

| | | | |
|---|---|---|---|
| 5,437,553 A * | 8/1995 | Collins et al. | 434/322 |
| 5,539,869 A * | 7/1996 | Spoto et al. | 715/207 |
| 5,545,044 A | 8/1996 | Collins et al. | |
| 5,577,919 A | 11/1996 | Collins et al. | |
| 5,597,312 A * | 1/1997 | Bloom et al. | 434/362 |
| 5,727,951 A * | 3/1998 | Ho et al. | 434/362 |
| 5,779,486 A * | 7/1998 | Ho et al. | 434/353 |
| 5,797,754 A * | 8/1998 | Griswold et al. | 434/322 |
| 5,812,134 A * | 9/1998 | Pooser et al. | 715/848 |
| 5,905,991 A * | 5/1999 | Reynolds | 715/234 |
| 6,022,221 A * | 2/2000 | Boon | 434/156 |
| 6,039,575 A * | 3/2000 | L'Allier et al. | 434/323 |
| 6,112,049 A * | 8/2000 | Sonnenfeld | 434/350 |
| 6,141,529 A * | 10/2000 | Remschel | 434/350 |
| 6,149,441 A * | 11/2000 | Pellegrino et al. | 434/350 |
| 6,260,033 B1 * | 7/2001 | Tatsuoka | 706/45 |
| 6,287,123 B1 | 9/2001 | O'Brien | |
| 6,418,298 B1 * | 7/2002 | Sonnenfeld | 434/350 |
| 6,419,496 B1 * | 7/2002 | Vaughan, Jr. | 434/322 |
| 6,509,898 B2 * | 1/2003 | Chi et al. | 345/440 |
| 6,546,558 B1 * | 4/2003 | Taguchi | 725/135 |
| 6,551,109 B1 * | 4/2003 | Rudmik | 434/322 |
| 6,652,283 B1 * | 11/2003 | Van Schaack et al. | 434/236 |
| 6,807,535 B2 * | 10/2004 | Goodkovsky | 706/3 |
| 7,014,467 B2 * | 3/2006 | Krebs et al. | 434/118 |
| 2002/0087416 A1 * | 7/2002 | Knutson | 705/23 |
| 2002/0160344 A1 | 10/2002 | Tulsky | |

FOREIGN PATENT DOCUMENTS

| | | |
|---|---|---|
| JP | A 11-015361 | 1/1999 |
| WO | WO 01/88878 | 11/2001 |

* cited by examiner

RECALLING ITEMS OF INFORMATION

This is a Continuation-in-Part of Application No. PCT/AU2003/001128 filed Sep. 2, 2003. The entire disclosure of the prior application is hereby incorporated by reference herein in its entirety.

FIELD OF THE INVENTION

This invention relates to a way of teaching and testing a user's ability to recall items of information linked together in a sequence or in a tree-like structure in response to a prompt.

BACKGROUND OF THE INVENTION

During schooling, students are presented with vast quantities of information. Some of this information is easily remembered by some students, and less easily remembered by other students. Moreover, some of the information is more important, and this distinction may be made by a student when trying to commit the information to memory. Once information is remembered, students are then faced with the difficulty of retaining the information in memory long enough for it to be retrieved for the purpose of completing an assessment, or more preferably, for use later in life. This difficulty can be substantially overcome by shifting the information from short-term memory to long-term memory.

There are many established learning techniques which are said to improve one's ability to remember certain facts or items of information over both short and long periods of time. Rehearsal or repetition of facts and activities is useful in reinforcing one's memory of certain items of information and may be practiced during revision of coursework done by students in preparation for exams. However, it is difficult to manage a learning program which is directed towards committing vast quantities of information to memory.

Learning devices and systems exist which use rehearsal or repetition to test one's memory. However, they are deficient because they often fail to cater to an individual's ability to learn information. Further, they fail to address the fact that the better "memorized" an item of information is, the less frequently it must be revised in order to be retained in one's memory.

In addition, given the vast amount of information currently available it is unrealistic to think that one could learn all of it. Different pieces of information have different importance, and current testing methods fail to assert learning of important information over relatively unimportant information. Accordingly, a need exists for a method of systematically testing memory which addresses these deficiencies in current learning practices.

The discussion of the background to the invention included herein including reference to documents, acts, materials, devices, articles and the like is intended to explain the context of the present invention. This is not to be taken as an admission or a suggestion that any of the material referred to was published, known or part of the common general knowledge in the patent area as at the priority date of any of the claims.

SUMMARY OF THE INVENTION

According to a first aspect of the present invention, there is provided a method of teaching and testing a user's ability to recall one or more items of information using an automated testing device, wherein each of the one or more items of information are connected to a prompt by one or more links, the method including the steps of:

(a) teaching the user by presenting the user with the links and the one or more items of information that are connected to the prompt;
(b) testing the user by:
  (i) the testing device presenting the prompt to the user;
  (ii) the user recalling the items of information which are connected to the prompt;
  (iii) the user using the testing device to review each item of information connected to the prompt; and
  (iv) the user comparing the recalled and reviewed items of information and providing input to the testing device indicating the user's ability to recall each of the items of information connected to the prompt;
(c) using the input provided by the user to calculate when the testing device will automatically re-test the user; and
(d) re-testing the user.

According to a second aspect of the present invention, there is provided a method of teaching and testing a user's ability to recall one or more links connecting items of information to a prompt using an automated testing device, the method including the steps of:

(a) teaching the user by presenting the user with the links and the one or more items of information connected to the prompt;
(b) testing the user by:
  (i) the testing device presenting a prompt to the user;
  (ii) the user recalling the links which connect one or more items of information to the prompt;
  (iii) the user using the testing device to review each link connected to the prompt; and
  (iv) the user comparing the recalled and reviewed links and providing input to the testing device indicating an ability to recall each of the links connected to the prompt;
(c) using the input provided by the user to calculate when the testing device will automatically re-test the user; and
(d) re-testing the user.

The testing device may be any suitable device which is programmed with at least one prompt and one or more items of information and/or links to be learnt by the user. It is preferred that the testing device is a computer such as a desktop or laptop computer, or a personal digital assistant. The prompt may be a question such as, "what are the available treatments for heart attack?" or a unit of subject matter such as "vegetables for planting in August" or any other material which has one or more associated items of information to be learnt, and links connecting the items to the prompt. The links may be arrows, bullet marks, numerical, alphabetic or any other type of link.

The prompt, links and items of information may be presented to the user for learning in any suitable way. In a preferred embodiment, they are presented on a screen such as a computer screen, prior to the user being tested. Alternatively, the prompt, links and the items of information may be presented using an audible, tactile or any other such device, depending on the nature of the concept and the associated items of information being learnt. Similarly, the links may take any suitable form. In a preferred embodiment, the links are arrows which link each of the items of information to the prompt or concept being learnt.

Prior to testing the user, the testing device provides the user with an opportunity to learn the subject matter to which the prompt is connected. Accordingly, the testing device presents the user with the prompt or "concept". This may be in the form of a question (e.g. "How would one treat a heart attack?"), followed by one link at a time which connects that prompt to each connected item of information to be recalled.

This provides the user with an opportunity to learn or "memorize" each item of information and the link to it.

The teaching and testing method is based on the fact that the human mind has an almost limitless ability to form individual mental links between pieces of information. The reliability (ability to recall) of these links is based on the amount of arousal of the human mind at the time of their formation and review. There is also an exponential relationship between how often a given link is used and a person's ability to recall that link and related pieces of information. Therefore, it is preferred that there is a delay between the user learning the information and the user being tested. The delay may be any length of time, and it is preferred that the delay is adjustable according to the difficulty level and/or volume of the concept being learnt and/or the user's learning ability.

This basic structure of 2 items linked in memory may be used to chain together a list of items of any length, or if more than one link from a given item exists, a tree of items of any depth. This principle can also be applied to the teaching and testing method of the present invention by providing a tree structure wherein an item of information behaves as a secondary prompt which is connected to additional items of information by subsequent links. In some circumstances, the tree structure may loop back on itself in such a way that a link from an item of information lower down in the tree structure loops back to an item further up the 'tree'. These structures provide for a sequence or list of items to be learned. Each item may be a "concept" the human mind can itemize, including things, actions or other. Altogether, this sequence may form a representation of an answer to an initial prompt, which can be learned both as a whole and in parts.

Although the user may be tested by presenting the prompt to the user, the user may also be presented with one or more hints to assist the user in recalling one or more of the items of information. The hints may be in the form of the links which connect each of the items of information to the prompt. When tested, the user provides input to the testing device using any suitable input device. The input device may include a mouse, a keypad, a touch screen, or any other suitable device.

It is preferred that the user is first presented with the prompt, or question and then uses the input device to instruct the testing device to present hints or links. Alternatively, the user may not require hints and may provide input to the testing device indicating his or her ability to recall each of the one or more items of information and/or the links to them. The hints and/or links may be presented individually or together. When presented together, they may indicate to the user the number of items of information which are associated with the concept, and this may assist the user in recalling those items. The user will then have to rely on his or her earlier learning or memory of the prompt and the connected items of information in an attempt to recall what should have been learnt.

The user recalls the one or more items of information and/or links connecting them by re-creating the links and items of information which are connected to the prompt. Such re-creation may be in the form of a mental visualization and involve the user forming a mental image of what has been previously learnt. Alternatively, the user may recall the links and items of information and re-create them on paper so that a comparison can be made and the user can indicate his or her ability to recall each of the items. As another alternative, the user may re-create the links and items of information using tools which may be provided by the testing device, such as drag and drop images and text boxes. In such an embodiment, particularly when there are multiple levels or "branches" of information to be learnt, the testing device may present the items of information arranged at random, and the user may re-arrange them to re-create the links and items of information as they were learnt, thereby indicating his or her ability to recall those items.

The user provides input to the testing device to indicate his or her ability to recall each of the items of information associated with the concept, and/or the links connecting them. The user's ability may be categorized in any suitable manner. In a preferred embodiment, the user's ability to recall the items of information and/or links is characterized into levels as follows:

(a) recalled exactly;
(b) almost recalled; and
(c) did not recall.

The levels are then used by the testing device to calculate when the user is to be retested automatically. It is preferred that use of these levels results in the user being re-tested for items of information and links which the user did not recall sooner than re-testing for those items and links which were almost recalled and those which were recalled exactly. The testing device then re-tests the user accordingly.

The testing device can be programmed to calculate when the user is to be re-tested, using any suitable scheduling method. Between tests, the user may learn new concepts or subject matter. For example a medical student might come home after a day of learning about new diseases and use the testing device for learning and testing that information. After reviewing the prompts related to the new diseases, the testing device will automatically calculate when the user is to be tested and re-tested.

The testing device may calculate when the user is to be re-tested using any appropriate method. This may include a calculation which is based on the difficulty level of the subject matter being tested, or the number of different prompts which have been "taught to the user" (e.g. test the user's knowledge about a concept when the user has since learnt about 5 other subjects). Alternatively, the calculation may be based on a pre-determined period of time which elapses between the user learning information linked to a prompt and then being tested.

In a preferred embodiment, calculation of testing intervals is based on a desired minimum time interval between the user being presented with the prompt, links and related items of information for the first time, the first test and each subsequent test. In such an embodiment, each item and/or link has an associated testing interval which may be set to a default value, prior to the user being tested for the first time. After a user has been tested once, the testing interval for each item of information and/or link may be changed according to the user's level of recollection for each item/link. The testing interval being calculated may refer to either the link or to the item or both together.

In a preferred embodiment, each level of recollection is assigned a multiplier in addition to the minimum time interval between tests. These are used to adjust the testing interval. This multiplier and minimum time interval may also be adjusted from a default value by the user. Appropriate multipliers may be assigned as follows:

| LEVEL OF RECOLLECTION | TESTING INTERVAL MULTIPLIER |
| --- | --- |
| Recalled exactly | 4 |
| Almost recalled | 1 |
| Did not recall | 0.25 |

In such an embodiment, items which were almost recalled will be re-tested after an interval which is the same as the initial interval which elapsed between the user first being presented with the items of information and links and the first test. Items and/or links which were recalled exactly will be re-tested after 4 times the initial interval and items and/or links which were not recalled will be re-tested after an interval which is one quarter of the initial interval. It is to be understood that the testing interval multipliers exemplified are not to be taken as limiting or exact, and that any suitable testing interval multiplier and/or initial testing interval may be employed.

In another embodiment an Interval Index which represents the number of times a user has correctly recalled an item (in excess of the number of times they incorrectly recalled it) is used to determine the testing interval. For example, if the user recalls an item correctly 4 times in a row, the interval index used to determine when the next test will occur will refer to the $4^{th}$ testing interval (as the interval index for that item or link will be 4), and that $4^{th}$ testing interval is typically longer than the $3^{rd}$ taking advantage of a 'Spacing Effect'. Preferably, the user is able to override such settings, as may be desirable at the time of planning their study.

In yet another embodiment, in addition to simply adding the number of times a user has correctly recalled an item, in excess of the number of times he/she forgets it, more complicated formulae may be applied which incorporate the historical pattern of correct vs. incorrect results to decide on the next testing interval.

The common theme amongst these embodiments is they employ different detail in methods to calculate, in the event of a user correctly recalling a piece of information or links to it, an increasing interval of time until the time of 'next testing' of that piece of information or links to it. In the event that the user does not recall the information or links to it, the testing interval either remains unchanged, or is decreased until the user's ability to recall that information or the links to it is tested.

Each item of information and/or link being tested may also be allocated an importance weighting for adjusting the testing interval. In such an embodiment, the importance weighting may be used to determine the order in which the items and links are tested, so that higher weighted items and links are due for testing before lower weighted items and links. This minimizes the likelihood of a user wasting valuable time "re-learning" items of information and links which have less importance than others.

In a third aspect of the present invention, there is provided a computer program for testing a user's ability to recall one or more items of information and/or one or more links associating the items of information with a prompt by performing steps including:
(a) presenting a user with a prompt to which the one or more items of information connected by one or more links;
(b) receiving input from the user which indicates the user's ability to recall:
  (i) each of the one or more items of information; and/or
  (ii) each of the one or more links;
(c) automatically calculating when the user's ability to recall each of the one or more items of information and/or links will be re-tested based on the input received from the user; and
(d) re-testing the user.

The computer program may be created using any suitable programming language. It is preferred that the user's ability to recall each of the items of information and/or links is tested by further including the step of presenting the user with a link or hint for one or more of the items of information or links. This may assist the user in recalling each item. The step of automatically calculating when the user will be re-tested may also be based on an importance weighting which is allocated to one or more of the items of information or links. This enables the user to be tested less frequently for items of information which are less important than other items of information.

In one embodiment of the invention, an automated testing device for systematically testing a user's ability to recall one or more items of information and/or one or more links connecting the items of information is provided. The testing device includes presentation means for presenting the items of information and the links to the user, input means for receiving input from the user and a processing device for running the computer program.

The presentation means may be any suitable means such as a computer screen or monitor for prompts (or questions) which can be presented visually. Alternatively, the presentation means may be a speaker or other device, including a device for prompts which can be presented audibly or using tactile stimulus. This may be particularly useful in learning applications for the hearing or visually impaired, or for music students.

The input means may include any suitable input device or combination of input devices. Accordingly, the input means may include a computer, keyboard, mouse, trackball, static detector or touch screen, or even a voice or sound detection device.

The software may be written using any suitable programming language and stored on a suitable storage medium such as a computer hard disk, a CD ROM, optical disc or other electronic storage device. It is preferred that a testing strategy software component stores the prompts, items of information and links to be learnt and tested. However, storage may occur elsewhere. These prompts are preferably divided into chapters which contain a plurality of prompts with one or more prompts being conveyed on a "card". A "card" may contain items of information which are linked to one or more prompts in a tree-like or "branched" configuration (which may or may not link back on itself) where the items of information are presented in layers.

The processing device may be any suitable device such as a computer processor capable of executing instructions stored on the testing strategy software component.

In a preferred embodiment, the testing device further includes a testing interval storage component for storing a testing interval which is associated with one or more of the items of information and/or links. The testing device may also include an importance weighting storage component for storing an importance weighting which is allocated to one or more of the items of information and/or one or more of the links.

BRIEF DESCRIPTION OF THE DRAWINGS

The invention will herein after be described in greater detail by reference to the attached drawings. It is to be understood that the particularity of the drawings does not supersede the generality of the preceding description of the invention.

DETAILED DESCRIPTION

Figure 1:
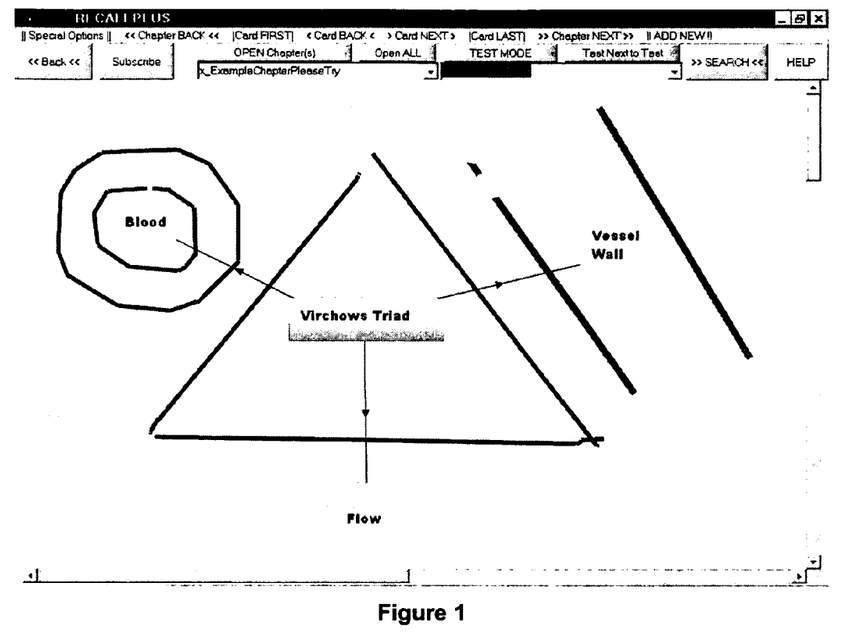
FIG. 1 shows a card containing a prompt "Virchows Triad" and 3 associated items of information to be tested "Blood", "Flow" and "Vessel Wall".

Referring firstly to FIG. 1, a "card" is opened which is used to test a user's knowledge of items of information which are linked to a concept or prompt. In the exemplary embodiment, the prompt is "Virchows Triad". Three links in the form of black arrows are shown. These links connect 3 items of information to the prompt on which the user will be tested. In the example provided, the items of information are:

1. Blood;
2. Vessel Wall; and
3. Flow.

When the user is first presented with this card, the prompt, links and each of the 3 items of information are fully visible. This enables the user to learn or memorize each of the items of information and links connecting them to the prompt. Once the user feels comfortable with the subject matter, he or she can ask to be tested. Alternatively, if not wishing to be tested yet, the user may request or search an associated database for a new card with different subject matter to learn.

In the example provided, the user selects "Test next due for testing". If only one card has been "learnt" or "reviewed" prior to this point in time, that card will be tested. However, if more than one card has been learnt, the testing device will test the user on whichever card has been automatically scheduled by the testing device as next in line for testing.

For each link and corresponding item of information, the testing device stores, data relating to the "time" at which the user's ability to recall each item of information and/or the link to it, is scheduled to be tested and the interval (in minutes, hours, days etc.) which is scheduled to lapse between tests. Accordingly, the testing schedule details for each of the links and items of information being tested in a single card are likely to vary, depending on the user's knowledge of and ability to recall each of the items.

Each of the links and associated items of information may also be allocated an importance weighting. This is particularly useful for learning subject matter using a prompt which has several associated items of information to be learnt and where some of the items of information are more important than others. In a realistic situation such as this, it is not as important for the user to remember some of the items of information as it is to remember other items of information. Consequently, it would be a waste of the user's time and effort to be tested as if all of the items of information were equally as important to the user or to the subject. Accordingly, the schedule details for each of the links and associated items of information may vary in accordance with each item's importance weighting and/or the user's knowledge of each of the items of information and links.

Figure 2:
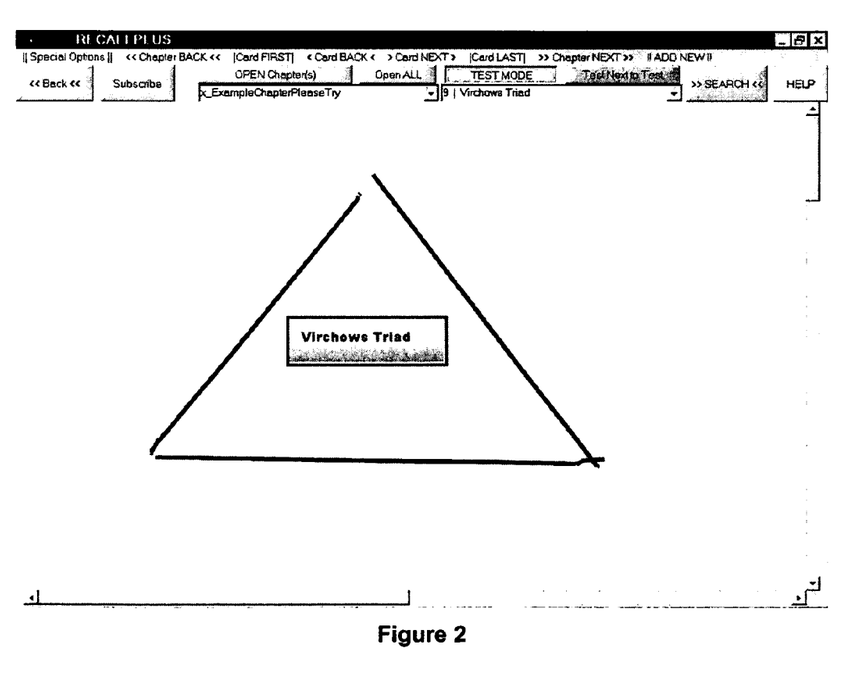
FIG. 2 shows a card being tested, where the prompt is presented to the user without the aid of links.

Upon requesting "Test next due for testing", when there are items or links due for testing on a given card, the user is presented with the prompt, as shown in FIG. 2. The user is then required to re-create the rest of the "card" by forming a mental image including each of the items of information which were connected to the prompt by the links. The user then clicks on the prompt and each of the 3 links, in the form of black arrows is displayed, indicating to the user that there are 3 items of information which are associated with the subject matter being tested. This can be used as a "hint" to the user if he or she was unable to independently recall or re-create a mental image of the "card" without further assistance. Other "hinting" tools may be built into the system to complement the teaching and testing method and device.

When the user clicks a second time on the prompt, "Virchows Triad" using a mouse, the user is presented with a visual display of each of the items of information, blood, vessel wall and flow. At this point any of these items may become a "nidus" for another item to be recalled. This is particularly useful if there are branches of information to learn. This is exemplified in FIGS. 3a, 3b and 3c which relate to anemia. Here, "FBC result" is a nidus or "prompt" for 3 subsequent items of information, "Macrocytic", "Normocytic", and "Microcytic". In this example, "Macrocytic" is a secondary nidus or "prompt" for 3 further items of information, "B12 and Folate Levels", "Smear" and "Liver Function Tests".

Eventually all the links and items on the card, in response to the initial prompt, are shown. The user is then required to indicate to the testing device how successful he or she was in recalling each of the items of information and/or links connecting the items to the prompt. In one embodiment, at the time of completion of testing of the card, each item to be recalled is surrounded by a green colored box. This indicates to the user that the testing device assumes that the user recalled each item perfectly. If this is not the case, the user provides input to the device to indicate the user's level of recollection.

The user may "Right Click" a mouse button once to make the box orange, indicating that this item was not perfectly recalled but was "almost recalled". Two "Right Clicks" changes the color of the box to red indicating to the system that the user "Didn't Recall" the item (and consequently requires testing more often). Similarly, the user may "Right Click" the mouse button over each link once or twice, changing the color of that link from green to orange or red respectively, where orange indicates that the user "almost recalled" the existence of that link and red indicates that the user "didn't recall" the existence of that link at all.

Figure 3A:
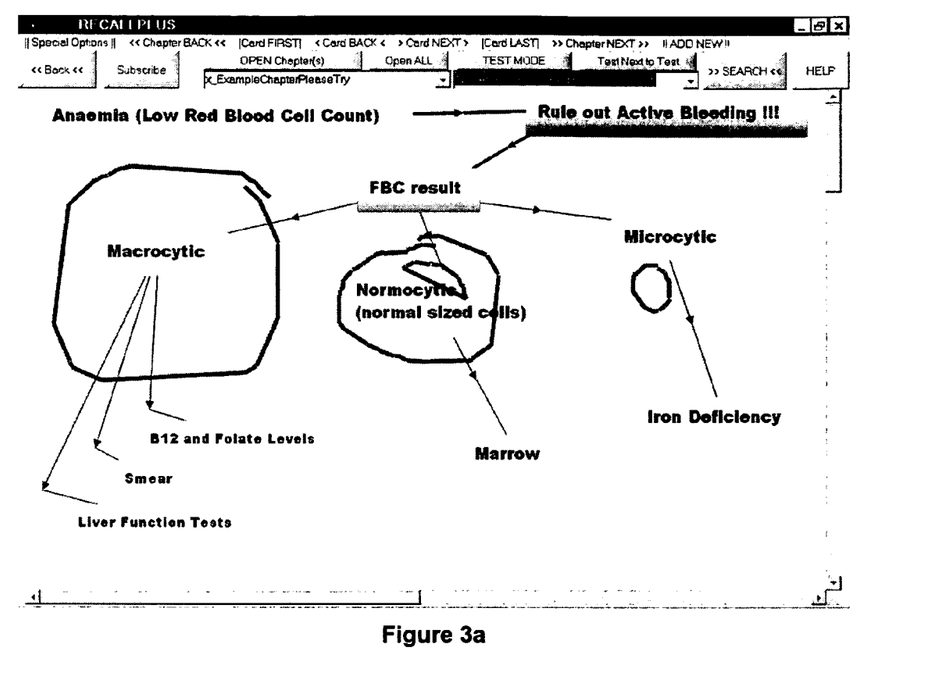
FIG. 3a shows a card for testing a user's knowledge of items of information relating to the prompt "Anemia (Low Red Blood Cell Count)".
Figure 3B:
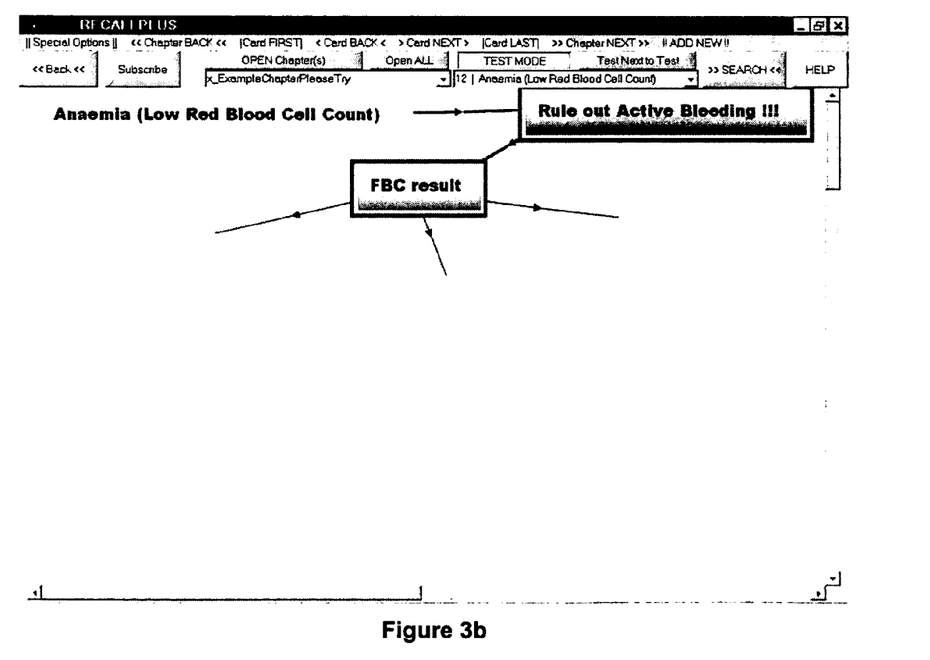
FIG. 3b shows part of the card of FIG. 3a, particularly showing one of the items of information, "FBC result" behaving as a secondary prompt, from which 3 further links extend.
Figure 3C:
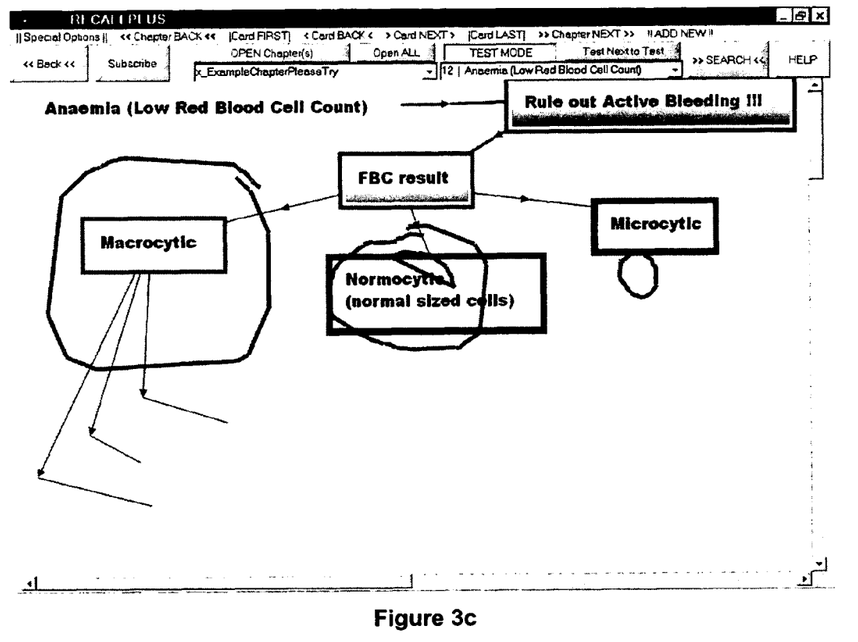
FIG. 3c shows part of the card of FIGS. 3a and 3b, particularly showing the secondary prompt "FBC result" and the items of information connected to the secondary prompt by the links referred to in FIG. 3b.
Figure 4:
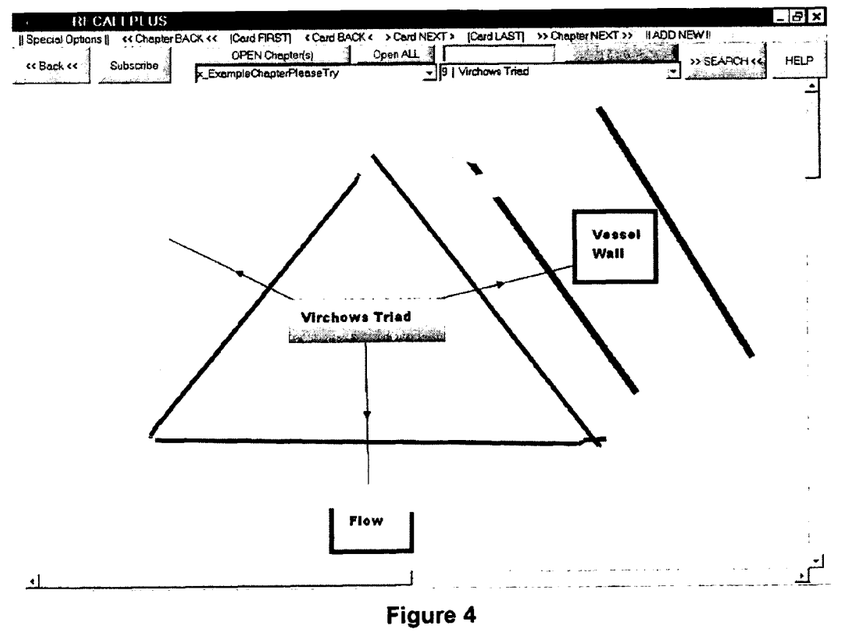
FIG. 4 shows the card of FIGS. 1 and 2 for use in a subsequent test in which the user's knowledge of Virchow's Triad is being tested.

Each of the items of information in the card shown in FIGS. 1 to 3 had a testing interval of 4 hours. However, this interval could be set to any suitable interval and may be adjusted according to the user's learning ability, the difficulty level of the information being learnt, or any other variable. Once the user has provided input to the testing device indicating his or her ability to recall each of the items of information and links connecting them to the prompt, the device automatically calculates when the user is to be re-tested for each item of information and/or link on the card.

Figure 5:
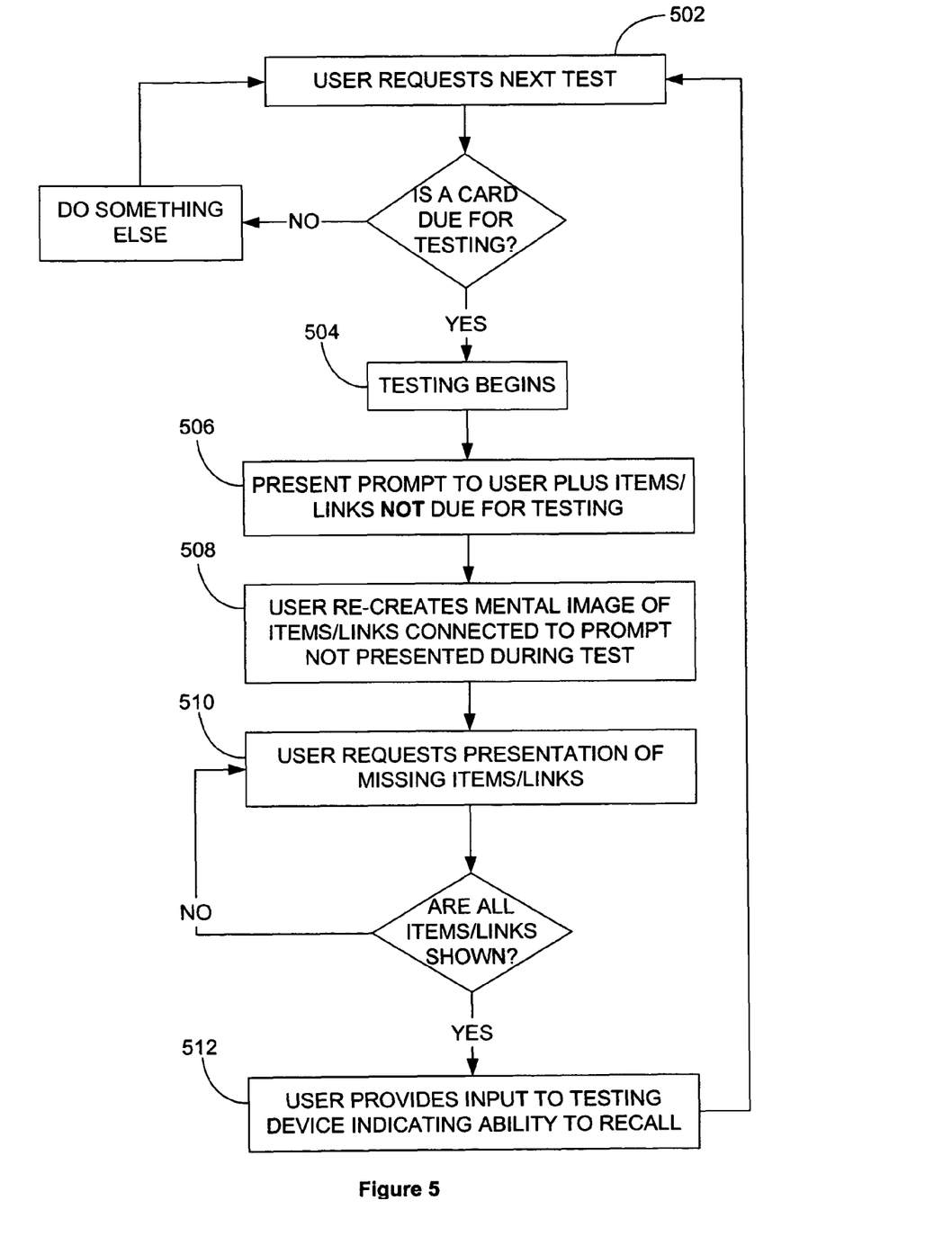
FIG. 5 is a flow diagram showing steps involved in an embodiment of the invention.

A simplified flow chart of the process is provided in FIG. 5. In a step 502, the user requests a card to be tested. If the testing device determines that the interval between tests for a certain card has elapsed, then that card is due for testing. If the testing device determines that no card is due for testing, the user is free to do something else. For a card that is due for testing, testing begins in step 504. In step 506, the user is presented with an initial prompt, along with any items of information and/or links which are not yet due for testing. These items of information and links are generally those which the user already has a relatively good recollection of, or ones which are of less importance relative to other items/links on that card.

In a step 508, the user re-creates a mental image of the card, attempting to recall those items and links which were not presented in step 506. In a step 510, the user requests items of information or links which were missing from the card in step 506 to be presented. These items/links may be presented one at a time as a hint to help the user recall the remaining items/links. Alternatively, all of the missing items/links may be presented together, if the user has indicated to the testing device that he or she has finished forming the mental image of the card.

When all of the items of information and links on the card have been presented to the user, in step 512 the user provides the testing device with input to indicate their ability to recall each of the items and/or links. This input may be provided in any suitable manner. One method of providing input enabling the user to indicate that they "didn't recall", "almost recalled" or "exactly recalled" each of the items of information/links has been described above. However, it is to be understood that the particular method described is not to be taken as limiting, and that other suitable methods may be used within the scope of the invention, as would be known to the person skilled in the art.

Testing the user's ability to recall or learn a "link" connecting two items of information is particularly useful when there are a number of links connecting an item of information to other items of information or prompts higher up in the tree. This is because in some learning situations, it is not the idea or item of information itself which has been forgotten, but the mental pathway which connects it to other information which is known. By testing the user's ability to recall links between items of information as well as the items of information themselves, the testing method and device addresses the aspects of learning which relate to both storage of information and the neural pathways which connect related items of information.

If in the example of FIGS. 1 to 3, the user perfectly recalled vessel wall, almost or partly recalled flow, but did not recall blood, then for the card in FIGS. 1 to 3, the testing intervals are adjusted as follows:

| ITEM OF INFORMATION or Item linked to | LEVEL OF RECOLLECTION of Item and/or link | TESTING INTERVAL MULTIPLIER of item and/or link | ADJUSTED TESTING INTERVAL (hours) |
|---|---|---|---|
| Vessel wall | Recalled exactly | 4 | 16 |
| Flow | Almost recalled | 1 | 4 |
| Blood | Did not recall | 0.25 | 1 |

Accordingly, items which were recalled exactly (vessel wall) will be re-tested after 16 hours have elapsed, items which were almost recalled (flow) will be re-tested after the same default interval of 4 hours has elapsed and items which were not recalled at all (blood) will be recalled much sooner, after only 1 hour has elapsed (or if this is less than the minimum set time interval it will be set to that minimum level). A similar approach may be taken to calculating the testing interval for testing the user's ability to recall links between items of information. Alternatively, an aggregate calculation may be made which combines the input provided by the user in relation to their ability to recall an item of information and the link connecting it to a prompt. The aggregate calculation can then be used to calculate a testing interval which tests both the item of information and the associated link together.

In the example provided, when the user selects "next test to test", or is automatically tested after the shortest adjusted testing interval has elapsed, the user will be presented with a card as shown in FIG. 5. Here, it can be seen that the only item of information being tested is "blood", as the other items are already shown. If the user indicates that he or she is now able to recall that item of information, the testing interval will be re-adjusted by the appropriate multiplier. In this case, if the user was able to exactly recall blood, the testing interval multiplier will be 4 and the new adjusted testing interval will be 4 hours. The testing interval for each of the items of information which were not tested in that test will remain the same as was determined in the previous test.

The present invention provides an effective method of learning items of information which are associated with a prompt because it tests items which are not well known more frequently than items which are well known. It is particularly useful because items of information may be connected in a branched arrangement enabling combinations and layers of information to be taught and tested individually and at different intervals. Further, a user's knowledge of and ability to recall items of information which are more important can be tested more frequently than items of information which are less important. An additional advantage is that the present invention is able to schedule testing by considering the user's ability to recall the items of information in combination with the relative importance of each of those items of information. FIG. 5 provides an overview of the steps performed by the exemplary testing device.

A further advantage of the present invention is that it can also be used to monitor the user's ability to recall the links which connect an item of information to a prompt or another item of information. This may be akin to testing the user's ability to re-connect the neural pathways which join items of information and concepts in the user's memory. Thus, the present invention tests and improves not only the user's ability to recall items of information, but improves their ability to re-establish the links which connect related items of information and concepts, improving their mental function and learning.

It is to be understood that the invention may be extended so that a testing interval can be allocated to each of a plurality of "cards", and that the plurality of cards may constitute all or part of a chapter. In such an embodiment, some of the cards may require more frequent testing than others in order for a user's knowledge of the subject matter of that chapter to reach a required proficiency.

It is to be understood that various alterations, additions and/or modifications may be made to the parts previously described without departing from the ambit of the present invention.

The claims defining the invention are as follows:

1. A method of teaching and testing a student's ability to recall a plurality of items of information using an automated testing device, wherein each of the items of information are connected, either directly or indirectly, to a prompt by one or more links, the method including the steps of:
   (a) teaching the student by presenting the student with the links and the plurality of items of information that are connected to the prompt;
   (b) testing the student by:
      the testing device presenting the prompt to the student;
      (ii) the student recalling the items of information which are connected to the prompt;
      (iii) the student controlling the testing device to reveal progressively items of information connected to the prompt, until a plurality of items of information connected to the prompt are presented simultaneously, and reviewing each item; and
      (iv) the student comparing the recalled and reviewed items of information and providing input to the testing device indicating the student's ability to recall each of the revealed items of information connected to the prompt;
   (c) using the input provided by the student to calculate when the testing device will automatically re-test the student; and
   (d) automatically re-testing the student according to the calculation in step (c).

2. A method of teaching and testing a student according to claim 1 wherein the prompt is an initial prompt and the items of information are connected in a branched arrangement, and wherein an item of information is connected to the initial prompt by a link and is also connected by one or more other links to one or both of (i) one or more other items of information and (ii) one or more secondary prompts.

3. A method of teaching and testing a student according to claim 1 further including the step of presenting one or more hints to assist the student in recalling one or more of the items of information or one or more of the links connecting the items of information to the prompt.

4. A method of teaching and testing a student according to claim 1 further including the step of using a testing interval multiplier associated with each item of information to calculate when the testing device will automatically re-test the student.

5. A method of teaching and testing a student according to claim 1 wherein each of the items of information has an associated importance weighting related to its relative importance and used to calculate when the testing device will automatically re-test the student.

6. A method of teaching and testing a student's ability to recall a plurality of links connecting items of information either directly or indirectly to a prompt using an automated testing device, the method including the steps of:
   (a) teaching the student by presenting the student with the links and the one or more items of information connected to the prompt;
   (b) testing the student by:
      (i) the testing device presenting a prompt to the student;
      (ii) the student recalling the links which connect one or more items of information to the prompt;
      (iii) the student controlling the testing device to reveal progressively links connected to the prompt until a plurality of links and items of information connected to the prompt are presented simultaneously, and reviewing each link; and
      (iv) the student comparing the recalled and reviewed links and providing input to the testing device indicating an ability to recall each of the revealed links connected to the prompt;
   (c) using the input provided by the student to calculate when the testing device will automatically re-test the student; and
   (d) automatically re-testing the student according to the calculation in step (c).

7. A method of teaching and testing a student according to claim 6 wherein the prompt is an initial prompt and the items of information are connected in a branched arrangement, and wherein an item of information is connected to the initial prompt by a link and is also connected by one or more other links to one or both of (i) one or more other items of information and (ii) one or more secondary prompts.

8. A method of teaching and testing a student according to claim 6 further including the step or presenting one or more hints to assist the student in recalling one or more of the items of information or one or ore of the links connecting the items of information to the prompt.

9. A method of teaching and testing a student according to claim 6 further including the step of using a testing interval multiplier associated with each link to calculate when the testing device will automatically re-test the student.

10. A method of teaching and testing a student according to claim 6 wherein each of the one or more links has an associated importance weighting related to its relative importance and used to calculate when the testing device will automatically re-test the student.

11. A non-transitory computer readable medium storing a computer program, the computer program causing a computer to execute a process for testing a student's ability to recall one or both of (i) one or more items of information and (ii) one or more links associating the items of information with one or more prompts, by controlling a testing device to perform steps including:
   (a) presenting the student with a prompt to which one or more of the items of information are connected either directly or indirectly by one or more links;
   (b) revealing progressively, in response to a request by the student, items of information until a plurality of items of information connected to the prompt are presented simultaneously;
   (c) receiving input from the student which indicates the student's ability to recall one or both of:
      (i) each of the one or more items of information; and
      (ii) each of the one or more links;
   (d) automatically calculating when the student's ability to recall one or more items of information and one or more links will be re-tested based on the input received from the student; and
   (e) automatically re-testing the student according to the calculation in step (d).

12. A non-transitory computer readable medium according to claim 11 wherein the steps further include presenting the student with a hint for recalling one or more of the items of information or one or more of the links.

13. A non-transitory computer readable medium according to claim 11 wherein the step of automatically calculating when the student's ability to recall each of the one or more items of information or links will be re-tested is influenced by an importance weighting which is allocated to one or more of the items of information or links.

14. A non-transitory computer readable medium according to claim 11 wherein the step of automatically calculating when the student's ability to recall each of the one or more items of information or links will be re-tested is influenced by a testing interval associated with one or more of the items of information or links.

15. An automated testing device for systematically testing a student's ability to recall one or more items of information or one or more links connecting the items of information, the testing device including:
(a) a processing device reading the computer readable medium of claim 11 and executing the computer program thereon;
(b) input means for receiving input from the student; and
(c) presentation means for presenting the items of information and the links to the student.

16. A method of teaching and testing a student according to claim 1, wherein the prompt is an initial prompting item of information.

* * * * *